United States Patent
Lavery

[19]

[11] Patent Number: 5,906,219
[45] Date of Patent: May 25, 1999

[54] PRESSURE SENSITIVE VALVES

[75] Inventor: Kieron John Lavery, Derry, Ireland

[73] Assignee: Pressure Wise Limited, Derry, Ireland

[21] Appl. No.: 08/707,453

[22] Filed: Sep. 4, 1996

[30] Foreign Application Priority Data

Sep. 5, 1995 [GB] United Kingdom .................. 9518073

[51] Int. Cl.$^6$ .................................................. F16K 17/00
[52] U.S. Cl. ............................ 137/467; 137/461; 251/75
[58] Field of Search ..................... 137/467, 461; 251/75

[56] References Cited

U.S. PATENT DOCUMENTS

| Re. 30,063 | 8/1979 | Turner et al. | 137/461 |
|---|---|---|---|
| 1,311,774 | 7/1919 | Ritter | 137/70 |
| 2,332,630 | 10/1943 | Fawkes | 251/75 |
| 2,707,479 | 5/1955 | Thomann et al. | 137/70 |
| 2,840,103 | 6/1958 | Gerhardt | 137/467 |
| 3,099,282 | 7/1963 | Miller et al. | 251/75 |
| 3,228,452 | 1/1966 | Watterson | 137/467 |
| 3,229,713 | 1/1966 | Wiegand | 137/467 |
| 3,390,831 | 7/1968 | Eaton, Jr. | 251/75 |
| 3,504,849 | 4/1970 | Quinn | 251/75 |
| 4,015,627 | 4/1977 | Bower | 137/467 |
| 4,240,458 | 12/1980 | Huff | 137/315 |
| 4,724,857 | 2/1988 | Taylor | 137/70 |
| 4,953,579 | 9/1990 | Phillips et al. | 137/106 |

FOREIGN PATENT DOCUMENTS

| 1261365 | 2/1988 | Germany | 137/70 |
|---|---|---|---|
| 1124-659 | 2/1988 | U.S.S.R. | 137/70 |

*Primary Examiner*—Denise L. Ferensic
*Assistant Examiner*—Joanne Y. Kim
*Attorney, Agent, or Firm*—Kanesaka & Takeuchi

[57] ABSTRACT

A pressure sensitive valve 10 comprises a valve body 12 defining a bore 14, an inlet port 16 and an outlet port 18. The inlet port 16 is in fluid communication with the outlet port 18 and defines a fluid flow path 20. The fluid flow path 20 is in communication with the bore 14. A reverse buckling member 22 extends at least partially across the bore 14, the member 22 being adapted to reverse its conformation when a set pressure has been exceeded. The valve 10 includes means for actuating inversion of the reverse buckling member 22 when the set pressure has been exceeded. The valve 10 also includes means for sealing the reverse buckling member 22 from the fluid flow path 20.

12 Claims, 6 Drawing Sheets

PRESSURE SENSITIVE VALVES

This invention relates to pressure sensitive valves and similar devices which open or shut, under set limiting or emergency conditions, by the action of a reverse buckling member within the body of the valve.

Various types of pressure sensitive valve have been described in the prior art. One type of known pressure relief valve exists, where the designed or set limiting condition is prevented from being exceeded by the bursting or rupturing of a metal disc, which disc is usually of special conformation and method of flange fixing. In such known pressure relief valves, the rupture of the disc is caused by either moving it under pressure towards a cutter blade or by allowing the pressure to blow the disc out of its flanged seating. Such pressure relief valves suffer from the disadvantage that the working medium is in constant contact with the valve actuator (metal of the bursting disc) and this can cause inaccuracies either because of metal corrosion or by the reinforcing action of mineral incrustations on the actuator's surface.

Another type of known pressure sensitive valve exists, where the designed or set limiting condition is prevented from being exceeded by the distortion or buckling of a pressure relief pin. Such valves suffer from the disadvantage that the buckling pin adds significantly to the overall size of the valve. Furthermore, buckling pins, on existing technology, need to be heat treated to ensure consistent batch-to-batch performance.

There is a need, therefore, for a more compact pressure sensitive valve which has its actuator out of contact with the working medium to be handled, whose actuator can be inspected or replaced at any time without affecting the fluid flow path and whose actuator can readily accommodate differences in production batches.

According to the present invention there is provided a pressure sensitive valve comprising a valve body having a bore, an inlet port and an outlet port, the inlet port being adapted for fluid communication with the outlet port when the valve is open, the inlet port and the outlet port defining a fluid flow path, the fluid flow path being in communication with the bore when the valve is open; a reverse buckling member extending at least partially across the bore, the buckling member being adapted to reverse its conformation when a set pressure in the valve has been exceeded; means for actuating inversion of the reverse buckling member when the set pressure in the valve has been exceeded; and means for sealing the reverse buckling member from the fluid flow path.

Preferably, the actuating means comprises a piston axially movable in the bore, one end of the piston being in operative association with the reverse buckling member.

More preferably, the sealing means comprises a sealing member adapted and arranged to permit axial movement of the piston in the bore and to prevent fluid in the fluid flow path from contacting the reverse buckling member.

Advantageously, the end of the piston distal the reverse buckling member is provided with a head shaped and dimensioned for sealing engagement with a recess in the inlet port and the piston is axially movable between a normally open position, in which the head is spaced-apart from the recess so that fluid can flow from the inlet port into the outlet port, and a closed position in which the fluid is retained in the inlet port.

Alternatively, the piston is dimensioned to extend from the bore into the inlet port for sealing engagement with the inlet port in a normally closed position and is slidably retracted so that fluid can flow from the inlet port into the outlet port in an open position.

Further alternatively, the end of the piston distal the reverse buckling member is provided with a head shaped and dimensioned for sealing engagement with the inlet port and the piston is axially movable between a normally closed position, in which the head is in sealing engagement with the inlet port and fluid is retained in the inlet port and an open position, in which the head is spaced-apart from the inlet port so that fluid can flow from the inlet port into the outlet port.

Advantageously, the reverse buckling member is a reverse buckling membrane which extends across the bore.

According to a second aspect of the invention there is provided a pressure sensitive valve comprising a valve body having an inlet port and an outlet port, the valve body incorporating a guideway associated with the outlet port; a reverse buckling member extending at least partially across the guideway, the buckling member being adapted to reverse its conformation when a set pressure in the valve has been exceeded; and means for actuating the inversion of the reverse buckling member when the set pressure in the valve has been exceeded, to open the outlet port.

Preferably, the actuating means is a piston axially movable relative to the guideway, one end of the piston being in operative association with the reverse buckling member and the opposite end of the piston being adapted for sealing engagement with the outlet port of the valve.

Advantageously, the reverse buckling member is a reverse buckling membrane which extends across the guideway.

Pressure sensitive valves according to the present invention may be used in any pressurised system including, but not limited to, a car braking system, a chemical processing plant, an oil or gas production facility, a carbonated beverage machine, a power station or a missile/aircraft system. Depending on the normal operational fluid pressure, it may be necessary to modify the surface area of the piston in contact with the fluid and/or to modify the materials for the various sealing means, as will be appreciated by a man skilled in the art.

Pressure sensitive valves according to the present invention may be used as pressure relief valves or as pressure shut off valves in order to protect equipment from being over-pressurised. A pressure relief valve vents excess pressure using a normally closed valve while a pressure shut off valve serves to isolate equipment from a high pressure source using a normally open valve. In addition, it is envisaged that pressure sensitive valves of the present invention may be used where a seal is required to be activated (opened or closed) by a specific or set pressure. The description hereinafter refers primarily to pressure relief valves and pressure shut off valves but is not limited thereto.

Embodiments of the invention will now be described, by way of example, with reference to the accompanying drawings, in which:

FIGS. 4 A–C and 4A'–C', respectively, show sectional and plan views of the conformation of three typical reverse buckling membranes, all suitable for use in a pressure sensitive valve according to the present invention;

In the drawings, similar numerals have been used to indicate like parts.

Figure 1:
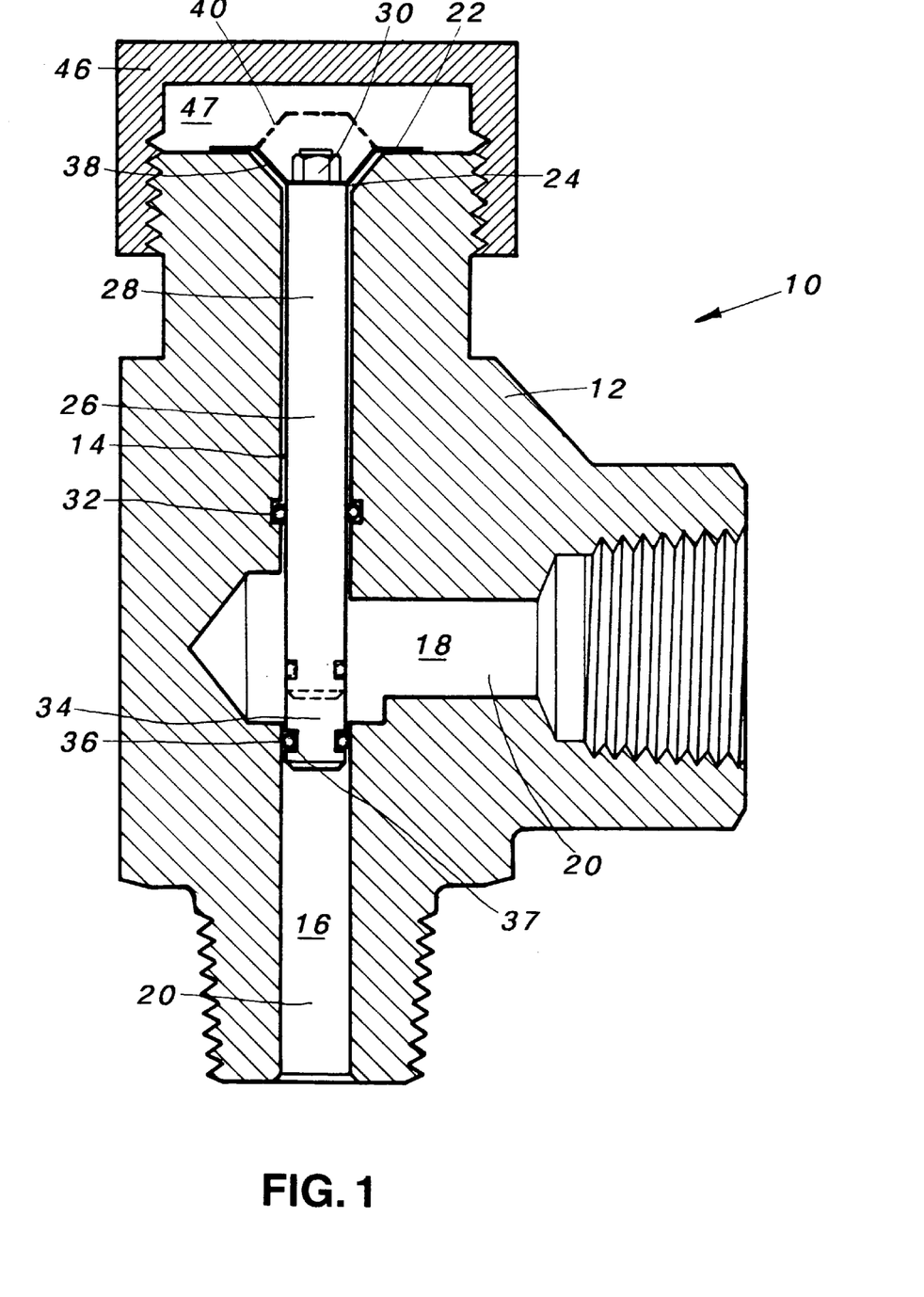
FIG. 1 shows a cross-sectional view of a normally closed pressure sensitive valve according to a first embodiment of the present invention, with a reverse buckling membrane in the normally closed (solid outline) or emergency open/exhaust (dotted outline) position.

Referring now to FIG. 1 of the accompanying drawings, there is illustrated a pressure relief valve generally indicated as 10 according to the present invention.

The pressure relief valve 10 comprises a valve body 12 defining a bore 14, an inlet port 16 and an outlet port 18. The inlet port 16 is in fluid communication with the outlet port 18 and defines a fluid flow path 20. The fluid flow path 20 is in communication with the bore 14.

A reverse buckling member in the form of a reverse buckling membrane 22 extends across the mouth 24 of the bore 14 distal the fluid flow path 20 and the rim of the membrane 22 is fixed to the valve body 12 in any conventional manner (not shown). The reverse buckling membrane 22 is adapted to reverse or invert its conformation when a set pressure has been exceeded.

A piston 26 is slidably moveable in the bore 14, as will be described in greater detail hereinafter. The end 28 of the piston 26 distal the fluid flow path 20 is in operative association with the reverse buckling membrane 22. In the present embodiment, the end 28 is fixedly engaged to the reverse buckling membrane 22 by means of a screw-threaded projection (not shown) extending from the end 28 through an aperture (shown only in FIG. 4A–C as 352, 452, 552) provided in the reverse buckling membrane 22 and fixed in place by a nut 30 or the like.

It will be appreciated that the reverse buckling member may take a number of forms which either fully or partially extend across the mouth 24 of the bore 14. For example, in the present embodiment, the reverse buckling member takes the form of a reverse buckling membrane 22 which is substantially disc-like in shape and which extends fully across and covers the mouth 24 of the bore 14. Alternatively, the reverse buckling membrane 22 may be substantially strap-like in shape (FIG. 4c) extending fully across but not fully covering the mouth 24 of the bore 14. Alternatively still, the reverse buckling member may take the form of a strap or semi-disc (not shown) which extends partially across the mouth 24 of the bore 14 between the body 12 and the piston 26. In each case, the reverse buckling member is adapted to reverse or invert its conformation when a set pressure has been exceeded.

A sealing ring 32 is located in the bore 14 and is adapted and arranged to permit axial movement of the piston 26 in the bore 14 and to prevent fluid in the fluid flow path 20 from contacting the reverse buckling membrane 22. A second sealing ring (not shown) may be located in the bore 14 adjacent the mouth 24, to prevent ingress of grit and the like from the surrounding atmosphere into the bore 14.

It will be appreciated that the provision of a second sealing ring adjacent the mouth 24 will be required if the reverse buckling membrane 22 is exposed during its normal operation. If, however, the reverse buckling membrane 22 is covered from the surrounding atmosphere by a plug or the like, the sealing ring, whilst not required, is desirable, to prevent ingress of grit into the bore 14.

The end 34 of the piston 26 distal the reverse buckling membrane 22 is sealingly engaged with the inlet port 16 by means of a sealing annulus 36.

The pressure relief valve 10 is a normally closed pressure relief valve 10 so that, in the normally closed position, the sealing annulus 36 is in sealing engagement with the inlet port 16 and fluid is retained in the inlet port 16. In the present embodiment, the sealing annulus 36 acts as the means for sealing the reverse buckling membrane 22 from the fluid flow path 20 when the valve 10 is in the normally closed position and the sealing ring 32 acts as the means for sealing the reverse buckling membrane 22 from the fluid flow path 20' when the valve 10 is in the open position. It will be appreciated that, when the valve 10 is in the normally closed position, a quantity of fluid (not shown) may be located in the outlet port 18. Under such conditions, the sealing ring 32 serves to seal the reverse buckling membrane 22 from the fluid located in the outlet port 18.

A screwed plug 46 defining a chamber 47 is provided, which plug 46 enables access to the reverse buckling membrane 22 for visual inspection and replacement if necessary.

In use, when the set pressure has been exceeded, the predetermined or set force on the piston 26 causes the reverse buckling membrane 22 to invert or reverse its conformation so that it moves from a normal position 38 (shown in solid outline) to an emergency position 40 (shown in dotted outline). This rearward movement (or retraction) of the piston 26 relative to the bore 14 causes the piston 26/sealing annulus 36 to slide out of sealing engagement with the inlet port 16 which, in turn, causes fluid to move from the inlet port 16 through to the outlet port 18. It will be appreciated that the chamber 47 of the plug 46 is shaped and dimensioned to permit buckling of the membrane 22 to the emergency position 40.

Figure 2:
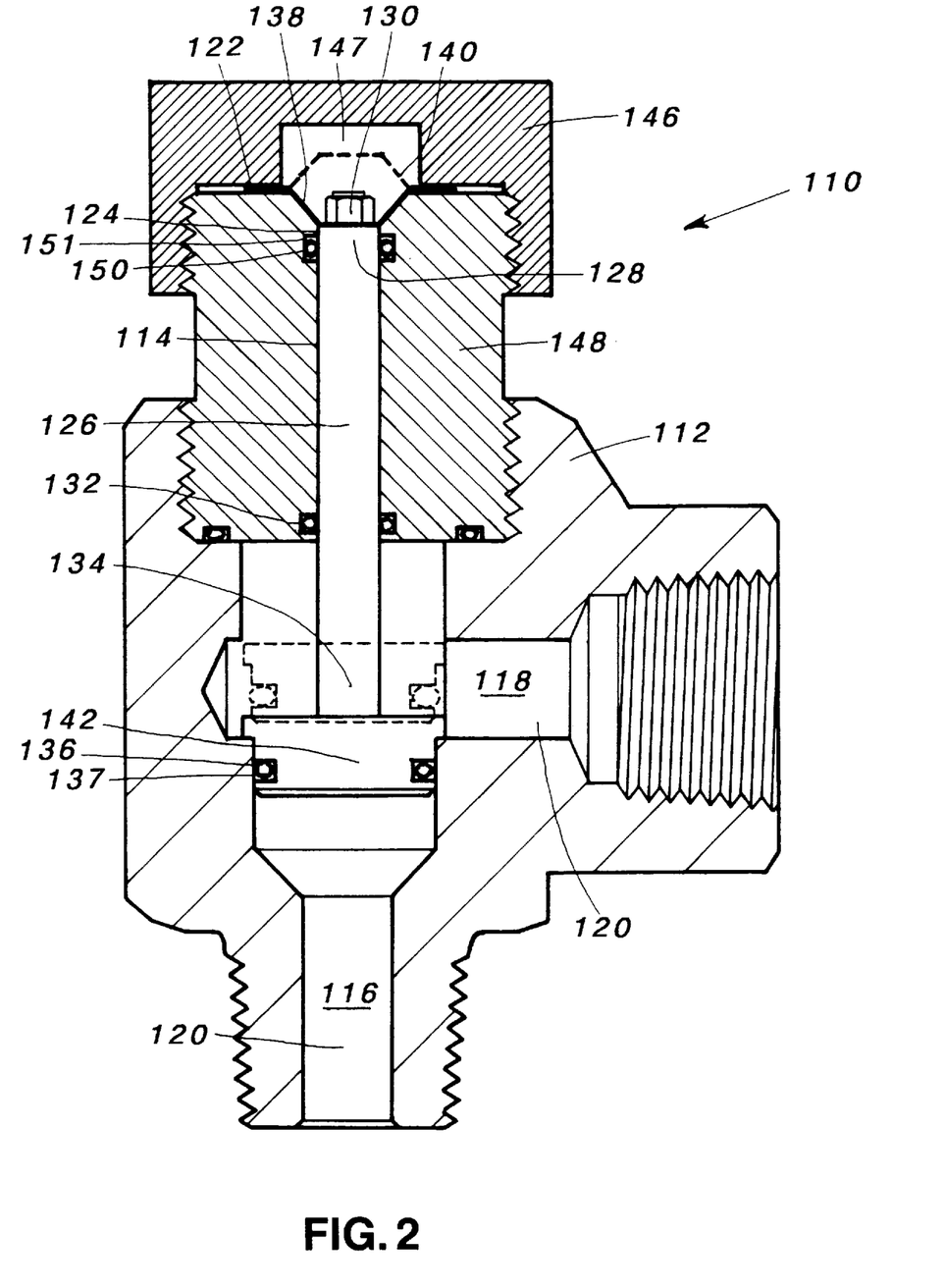
FIG. 2 shows a cross-sectional view of a normally closed pressure sensitive valve according to a second embodiment of the invention, with a reverse buckling membrane in the normally closed (solid outline) or emergency open/exhaust (dotted outline) position.

Referring now to FIG. 2 of the accompanying drawings, there is illustrated a second embodiment of a pressure relief valve generally indicated as 110, which is a normally closed pressure relief valve.

In the second embodiment, the valve body 112 includes a screw-threaded bonnet 148 which, in the first embodiment, is a unitary part of the valve body 12.

In the second embodiment, the end 134 of the piston 126 is shaped to form a head 142 which is shaped and dimensioned for sealing engagement with the inlet port 116 in the normally closed position.

A sealing annulus 136 is provided in an annular groove 137 of the head 142.

A first sealing ring 132 is provided in an annular groove in the bonnet 148 distal the reverse buckling membrane 122.

A second sealing ring 150 is provided in an annular groove 151 of the bonnet 148 adjacent the reverse buckling membrane 122.

In use, in the normally closed position, the sealing annulus 136 is in sealing engagement with the inlet port 116 and fluid is retained in the inlet port 116. Thus, the sealing annulus 136 acts as the means for sealing the reverse buckling membrane 122 from the fluid flow path 120 when the valve 110 is in the normally closed position. It will be appreciated that, in the normally closed position, a quantity of fluid (not shown) may be located in the outlet port 118. Under such conditions, the sealing ring 132 serves to seal the reverse buckling membrane 122 from the fluid located in the outlet port 118.

When the set pressure has been exceeded, the piston head 142/piston 126 is forced rearwardly into the bore 114, thereby causing the reverse buckling membrane 122 to invert so that it moves from the normal position 138 (shown in solid outline) to the emergency position 140 (shown in dotted outline). This rearward movement of the head 142/piston 126 relative to the bore 114 causes the head 142 to slide out of sealing engagement with the inlet port 116 which, in turn, permits fluid to move from the inlet port 116 through to the outlet port 118. Thus, the sealing ring 132 acts as the means for sealing the reverse buckling membrane 122 from the fluid flow path 120 when the valve 110 is in the open position. The second sealing ring 150 serves to prevent dirt or grit from entering into the bore 114.

In the second embodiment, the plug 146 is shaped to engage against the rim of the membrane 122, so as to fix the membrane 122 between the plug 146 and the bonnet 148 of the valve body 112.

It will also be appreciated that the chamber 147 of the plug 146 must be shaped and dimensioned to permit buckling of membrane 122 to the emergency position 140.

It will also be appreciated that the provision of a separable bonnet 148 permits access, if required, to the head 142 of the piston 126, if repair or inspection is desired.

Figure 3:
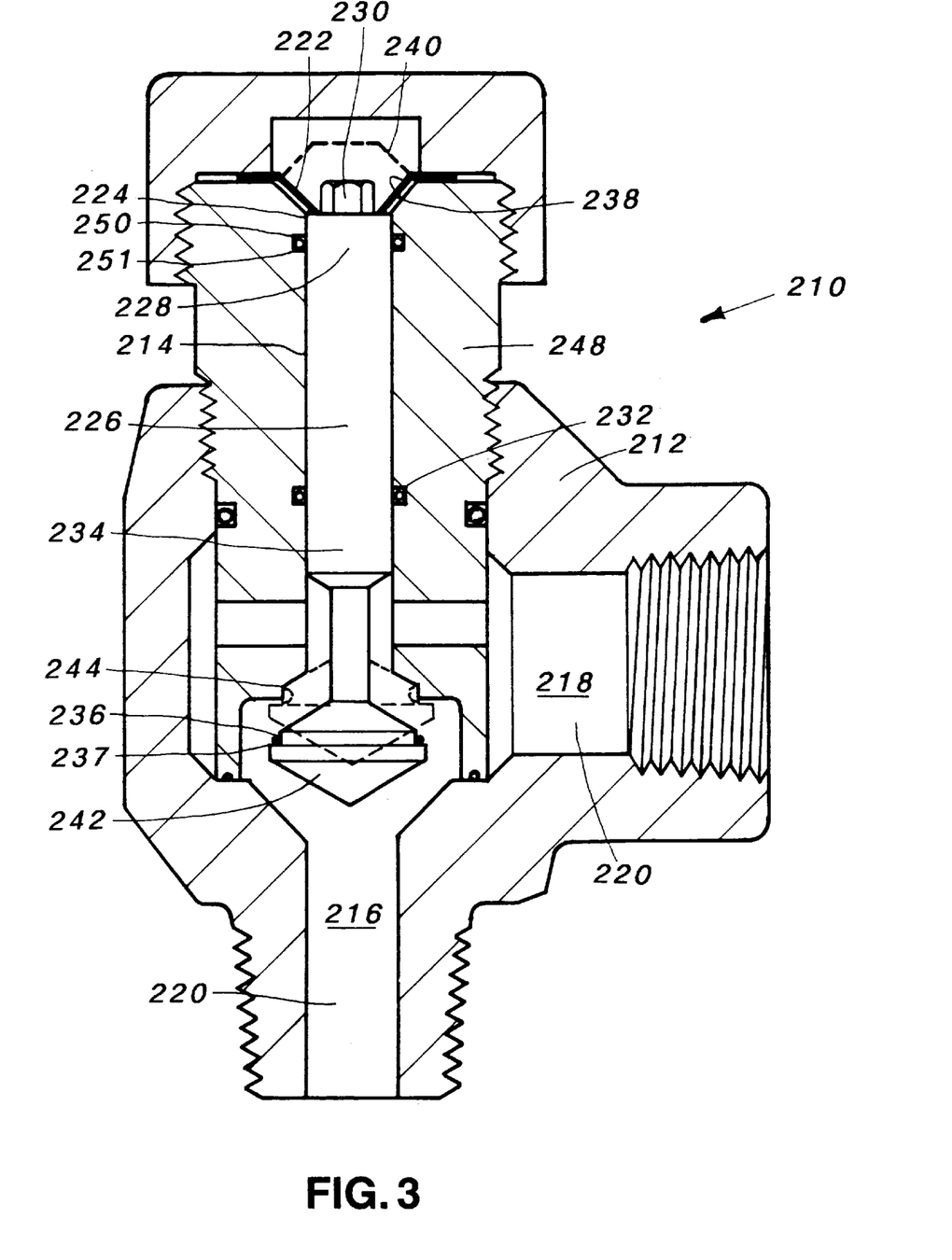
FIG. 3 shows a cross-sectional view of a normally open pressure sensitive valve according to a third embodiment of the present invention, with a reverse buckling membrane in the normally open (solid outline) or emergency closed (dotted outline) position.

Referring now to FIG. 3 of the accompanying drawings, there is illustrated a third embodiment of a pressure sensitive valve generally indicated as 210, which is a normally open pressure shut off valve.

In the third embodiment, the end 234 of the piston 226 is shaped to form a head 242 and a mating recess 244 is provided in the inlet port 216.

In use, in a normal or open position, the head 242 is spaced-apart from the recess 244 so that fluid flows from the inlet port 216 past the head 242 and out the outlet port 218.

When a set pressure has been exceeded, the piston 226 is forced rearwardly into the bore 214, thereby causing the reverse buckling membrane 222 to invert or reverse its conformation from a normal position 238 (shown in solid outline) to an emergency position 240 (shown in dotted outline). This rearward movement of the piston 226 into the bore 214 causes the head 242/sealing annulus 236 to come into sealing engagement with the recess 244, thereby preventing fluid flow from the inlet port 216 to the outlet port 218 so as to close the pressure shut off valve 210.

In the present embodiment the sealing means is performed by the sealing annulus 236 when the valve 210 is in the closed position and by the sealing ring 232 when the valve 210 is in the normally open position. It will be appreciated that, when the valve 210 is in the closed position, a quantity of fluid (not shown) may be located in the outlet port 218. Under such conditions, the sealing ring 232 serves to seal the reverse buckling membrane 222 from the fluid located in the outlet port 218. As in the second embodiment, the second sealing ring 250 prevents grit from entering the bore 214.

Figure 4A:
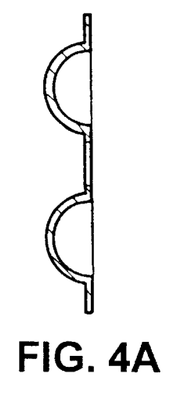
Figure 4B:
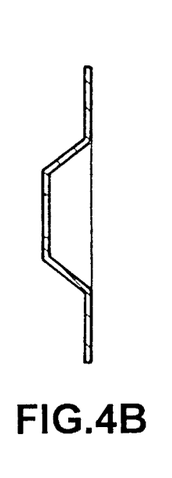
Figure 4C:
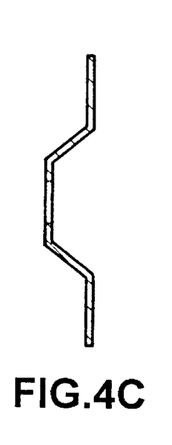

In the field of pipeline safety, it is possible to design a whole series of invertable metal membranes 22, 122, 222 and a few non-limiting examples of various conformations are illustrated in FIG. 4A–C and FIGS. 4A'–C' of the accompanying drawings. It will be appreciated that the sealing ring 32, 132, 232, the second sealing ring 150, 250 and the sealing annulus 36, 136, 236 may each be housed in annular grooves, which grooves are located either in the piston 26/piston head 42 or, alternatively, in the valve body 12, 112, 212. It is, however, desirable that the sealing ring 32 and the second sealing ring 50 be provided in annular grooves in the valve body 12, whereas it is desirable that the sealing annulus 36 be provided in an annular groove in the piston 26/piston head 142, 242. However, in any event, the sealing rings 32, 50 and the sealing annulus 36 should be housed in a manner which provides reliable sealing engagement.

It should be noted that, because of the provision of sealing means, the reverse buckling membrane 22, 122, 222 is fully protected from fluid flowing in, or retained by, the pressure sensitive valve 10, 110, 210 and is, therefore, not subjected to fluid temperature extremes or to possible corrosion by the fluids being handled.

Furthermore, since the membrane 22, 212, 222 can be accessed via the screwed plug 46, 146, 246, it is possible to inspect the membrane 22, 122, 222 at any time and to replace it without shutdown of the pipeline system because the fluid flow path 20, 120, 220 is sealed from the reverse buckling membrane 22, 122, 222. This is a particular advantage in the case of pressure sensitive valves 10, 110, 210 with larger fluid flow areas. Since emergency shutdown of a pressure relief valve 10, 110, 210 is a safety, rather than a functional, feature, it will be appreciated that such buckling membranes 22, 122, 222 can be in operation for a prolonged period of time. It is, therefore, an important advantage of buckling, as opposed to bursting, membrane pressure relief valves that the actuator or pressure-sensitive element—the membrane 22, 122, 222—is loaded and held in compression and will not, therefore, be subjected to long term fatigue.

A further advantage of buckling membrane, as opposed to pin, pressure relief valves lies in membrane's ready ability, as found in experimental practice, to accommodate small batch-to-batch variations in membrane material properties, by very small changes in membrane shape or conformation which do not entail expensive changes in press dies. In contrast, buckling pins, on existing technology, need to be heat treated to ensure consistent batch-to-batch performance of what is nominally material of the same specification.

Furthermore, from the identification point of view, it is easier to apply marks and serial numbers to such buckling membranes when compared with thin buckling pins. In addition, where space is a consideration, pressure relief valves of the present invention would be more compact than pressure relief valves incorporating buckling/rupture pins, due to the absence of the elongated buckling/rupturing pin itself.

Thus the pressure sensitive valves 10, 110, 210 according to the present invention incorporate a fluid isolated reverse buckling membrane 22, 122, 222 in which a set fluid pressure on the actuating means causes the membrane to invert, as opposed to the explosive blow-out of a bursting membrane. Those skilled in the art will realise that it is possible to design a series of sealing means for isolating the reverse buckling membrane 22, 122, 222 from the fluid in the pressure sensitive valve but, in doing so, it in no way detracts from the present invention of a fluid isolated buckling membrane to actuate the required emergency measure.

Figure 5:
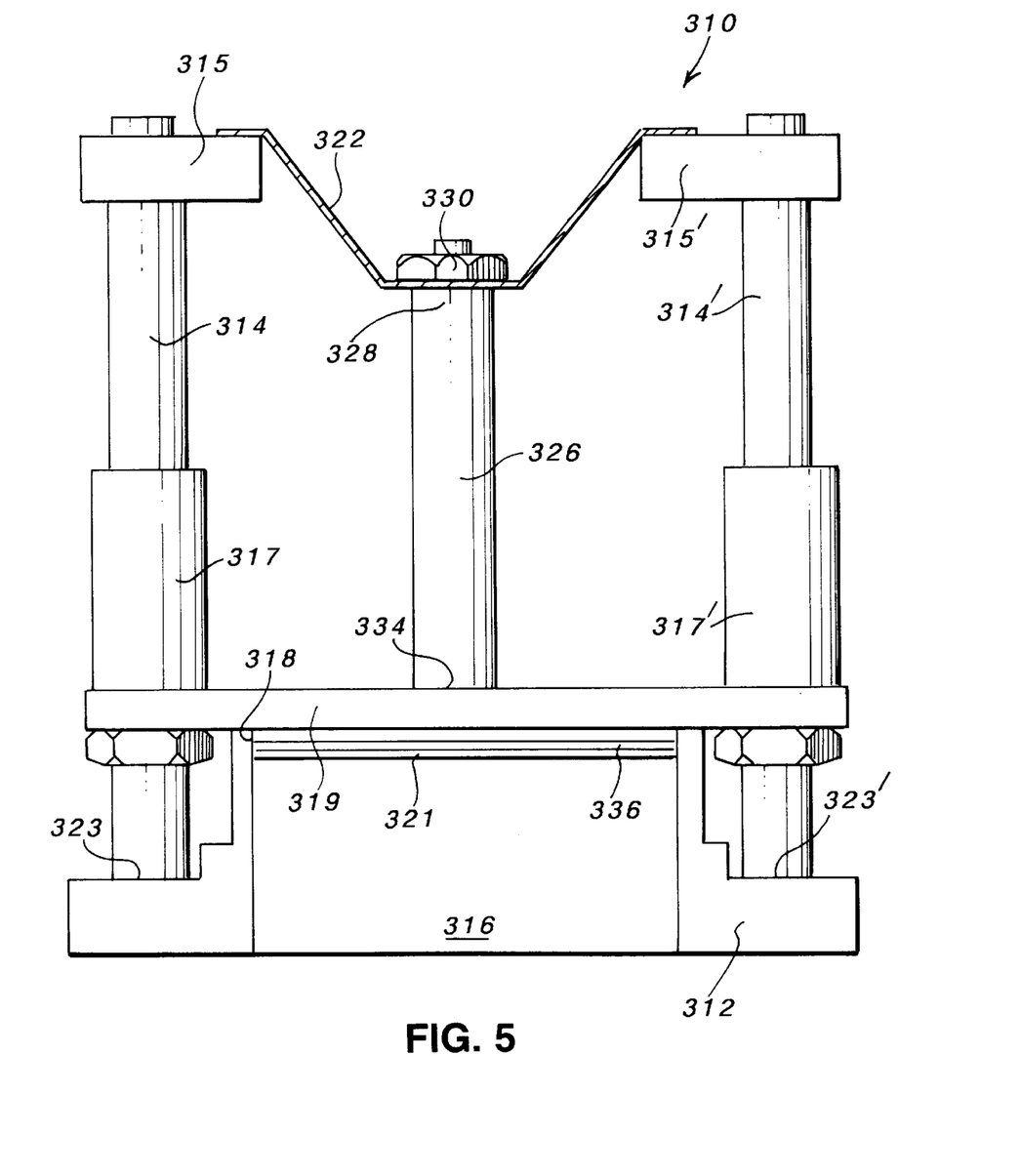
FIG. 5 shows a cross-sectional view of a normally closed pressure sensitive valve according to a second aspect of the invention, with a reverse buckling membrane in the normally closed position.
Figure 6:
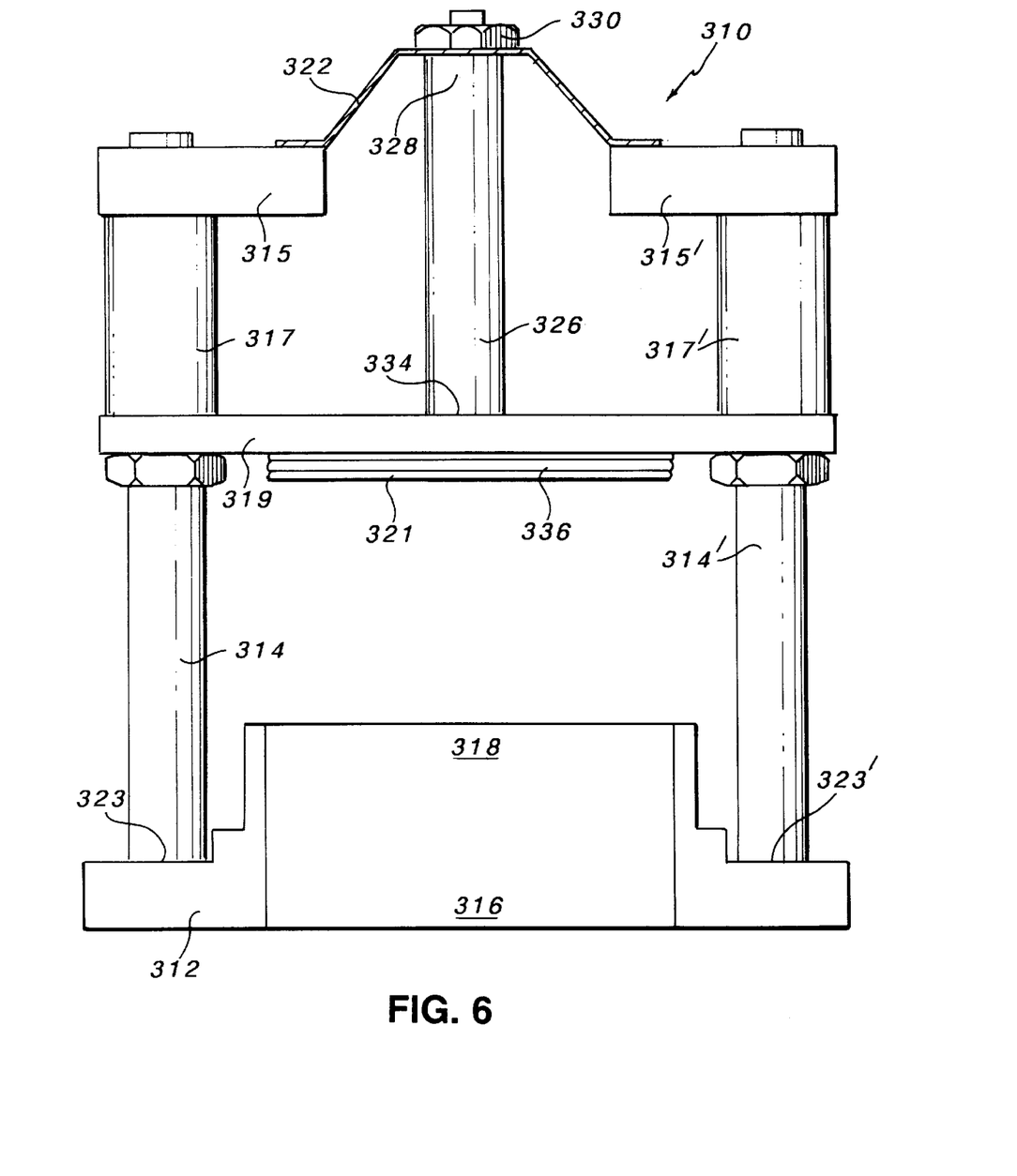
FIG. 6 shows a cross-sectional view of a normally closed pressure sensitive valve according to a second aspect of the invention, with a reverse buckling membrane in an open position.

FIGS. 5 and 6 show a pressure sensitive valve, generally indicated at 310, according to a second aspect of the invention. The valve 310, which is a pressure relief valve, includes a valve body 312 having an inlet port 316 and an outlet port 318.

A guideway comprises a pair of parallel, spaced-apart guide rods 314, 314', each guide rod 314, 314' having a respective shoulder-piece 315, 315' fixed adjacent one end of the guide rod 314, 314' in conventional manner. The respective opposite end 323, 323' of each guide rod 314, 314' is fixed in conventional manner to the valve body 312 on opposing sides of the outlet port 318.

A flange 319 is fixed to the end 334 of the actuating means or piston 326. A pair of parallel, spaced-apart sleeves 317, 317' are formed in, and extend substantially perpendicularly from, a face of the flange 319. A sealing plug 321 is formed in the opposite face of the flange 319. The sealing plug 321 includes a sealing ring 336 and is adapted for sealing engagement with the outlet port 318.

The piston 326 extends from the flange 319 between, and substantially parallel with, the sleeves 317, 317'. The sleeves 317, 317' are, in use, slidably mounted on the respective guide rods 314, 314'. The piston 326 is thus axially movable relative to the guide rods 314, 314'.

A reverse buckling member in the form of a reverse buckling membrane 322 is fixed to and extends between the shoulder-pieces 315, 315' of the guide way. The rim of the buckling membrane is fixed to the shoulder-pieces 315, 315' in any suitable conventional manner. The reverse buckling member 322 is adapted to reverse or invert its conformation when a set pressure has been exceeded. The end 328 of the piston 326 is fixed to the reverse buckling membrane 322 by the nut 330.

The pressure relief valve 310 is movable between a normally closed position (as illustrated in FIG. 5), in which the sealing plug 321 sealingly engages the outlet port 318 and the reverse buckling membrane 322 is in a normal position, and an open position (as illustrated in FIG. 6), in which the sealing plug 321 does not engage the outlet port 318 and the reverse buckling membrane 322 is in an inverted or emergency position. With the valve in the normally closed position, fluid (not shown) in the inlet port 316 is unable to flow through the outlet port 318 into the surrounding environment. With the valve 310 in the open position, the outlet port 318 is open to the surrounding environment.

In use, with the valve 310 in the normally closed position, when fluid (not shown) in the inlet port 316 exceeds a set pressure, the corresponding set force on the piston 326 causes the reverse buckling membrane 322 to invert or reverse its formation so that it moves from the normal position to the inverted or emergency position. The piston 326 thus moves upwardly, as viewed in FIGS. 5 and 6, so that the sealing plug 321 slides out of sealing engagement with the outlet port 318 which, in turn, causes the fluid to move from the inlet port 316 through the outlet port 318 and into the surrounding environment.

I claim:

1. A pressure sensitive valve comprising:
   a valve body having an inlet port, an outlet port and a fluid flow path between said inlet and outlet ports,
   an actuating member movable between a closed position wherein said actuating member prevents fluid flow along said fluid flow path and an open position wherein said actuating member permits fluid flow along said fluid flow path,
   a reveres buckling member operatively associated with said actuating member and having a first conformation normally maintaining said actuating member in one of said open and closed positions,
   said actuating member being exposed to fluid pressure in said valve body which pressure tends to move said actuating member to the other of said open and closed positions whereby when a set pressure on said actuating member is exceeded, said reverse buckling member automatically inverts to a second conformation which permits said actuating member to move, under influence of said fluid pressure, to the other of said open and closed positions, and
   means for sealing said reverse buckling member from fluid in said valve at least when said reverse buckling member is in said first conformation,
   wherein said reverse buckling member is a reverse buckling membrane secured at its periphery relative to said valve body and operatively associated with said actuating member intermediate its periphery, the set inversion pressure being solely determined by shape and material properties of the membrane.

2. A pressure sensitive valve according to claim 1, which further comprising:
   a bore provided in said valve body in communication with said fluid flow path,
   a piston axially movable in said bore, one end of said piston being operatively associated with said reverse buckling member and the other end of said piston extending out of said bore into said fluid flow path.

3. A pressure sensitive valve according to claim 2, wherein said sealing means comprising a sealing member surrounding said piston in said bore to prevent fluid in said fluid flow path from passing along said bore to said reverse buckling member.

4. A pressure sensitive valve according to claim 2, which further comprising:
   a recess provided in said inlet port, and
   a head provided at said other end of said piston, and shaped and dimensioned for sealing engagement with said recess,
   said piston being axially movable between a normally open position in which said head is spaced-apart from said recess so that fluid can flow from said inlet port into said outlet port and a closed position in which said fluid is retained in said inlet port.

5. A pressure sensitive valve according to claim 2, wherein said piston is dimensioned to extend from said bore into said inlet port for sealing engagement with said inlet port in a normally closed position and is slidably retracted so that fluid can flow from said inlet port into said outlet port in an open position.

6. A pressure sensitive valve according to claim 2, which further comprising a head provided at said other end of said piston and shaped and dimensioned for sealing engagement with said inlet port and
   said piston being axially movable between a normally closed position in which said head is sealing engagement with said inlet port and fluid is retained in said inlet port and an open position in which said head is spaced-apart from said inlet port so that fluid can flow from said inlet port into said outlet port.

7. A pressure sensitive valve comprising:
   a valve body having an inlet port, an outlet port and a fluid flow path between said inlet and outlet ports,
   an actuating member movable between a closed position wherein said actuating member prevents fluid flow along said fluid flow path and an open position wherein said actuating member permits fluid flow along said fluid flow path,
   a reveres buckling member operatively associated with said actuating member and having a first conformation normally maintaining said actuating member in one of said open and closed positions,
   said actuating member being exposed to fluid pressure in said valve body which pressure tends to move said actuating member to the other of said open and closed positions whereby when a set pressure on said actuating member is exceeded, said reverse buckling member automatically inverts to a second conformation which permits said actuating member to move, under influence of said fluid pressure, to the other of said open and closed positions, and means for sealing said reverse buckling member from fluid in said valve at least when said reverse buckling member is in said first conformation, a bore provided in said valve body in communication with said fluid flow path, a piston axially movable in said bore, one end of said piston being operatively associated with said reverse buckling member and the other end of said piston extending out of said bore into id fluid flow path, wherein said reverse buckling member is a reverse buckling membrane which extends across the bore.

8. A pressure sensitive valve comprising:

a valve body having an inlet port, an outlet port and a fluid flow path between said inlet and outlet ports, an actuating member movable between a closed position wherein said actuating member prevents fluid flow along said fluid flow path and an open position wherein said actuating member permits fluid flow along said fluid flow path, a reveres buckling member operatively associated with said actuating member and having a first conformation normally maintaining said actuating member in one of said open and closed positions, said actuating member being exposed to fluid pressure in said valve body which pressure tends to move said actuating member to the other of said open and closed positions whereby when a set pressure on said actuating member is exceeded, said reverse buckling member automatically inverts to a second conformation which permits said actuating member to move, under influence of said fluid pressure, to the other of said open and closed positions, and means for sealing said reverse buckling member from fluid in said valve at least when said reverse buckling member is in said first conformation, a guideway provided in said valve body so as to associate with said outlet port, said reverse buckling member extending at least partially across said guideway, said actuating member being slidably mounted on said guideway and having one end in operative association with said reverse buckling member and the opposite end adapted for sealing engagement with said outlet port of said valve.

9. A pressure sensitive valve according to claim 8, wherein said buckling member is a reverse buckling membrane which extends across the guideway.

10. A pressure sensitive valve according to claim 3, which further comprising:

a recess provided in said inlet port, and a head provided at said other end of said piston, and shaped and dimensioned for sealing engagement with said recess, said piston being axially movable between a normally open position in which said head is spaced-apart from said recess so that fluid can flow from said inlet port into said outlet port and a closed position in which said fluid is retained in said inlet port.

11. A pressure sensitive valve according to claim 3, wherein said piston is dimensioned to extend from said bore into said inlet port for sealing engagement with said inlet port in a normally closed position and is slidably retracted so that fluid can flow from said inlet port into said outlet port in an open position.

12. A pressure sensitive valve according to claim 3, which further comprising a head provided at said other end of said piston and shaped and dimensioned for sealing engagement with said inlet port and said piston being axially movable between a normally closed position in which said head is sealing engagement with said inlet port and fluid is retained in said inlet port and an open position in which said head is spaced-apart from said inlet port so that fluid can flow from said inlet port into said outlet port.

\* \* \* \* \*